United States Patent [19]
Knez

[11] Patent Number: 5,467,848
[45] Date of Patent: Nov. 21, 1995

[54] SLIDER ASSEMBLY FOR AUTOMOTIVE BRAKE CALIPER

[75] Inventor: Marijan Knez, Corona, Calif.

[73] Assignee: Aeromatics Automotive, Inc., Chino, Calif.

[21] Appl. No.: 109,177

[22] Filed: Aug. 18, 1993

[51] Int. Cl.$^6$ .................................................. F16D 65/14
[52] U.S. Cl. ...................... 188/73.45; 188/73.31
[58] Field of Search ..................... 188/73.31, 73.32, 188/73.33, 73.34, 73.43, 73.44, 73.45, 73.42

[56] References Cited

U.S. PATENT DOCUMENTS

| | | | |
|---|---|---|---|
| 4,189,032 | 2/1980 | Farr | 188/73.44 |
| 4,762,206 | 8/1988 | Arimitsu | 188/73.45 |
| 4,823,920 | 4/1989 | Evans | 188/73.35 |
| 5,090,520 | 2/1992 | Gockel et al. | 188/73.35 |

OTHER PUBLICATIONS

Technical Paper by Marijan Knez entitled "Test Procedures Done on GM Brake Caliper, at Aeromatics Experimental Facilities," Sep. 1, 1992, four pages.
Article entitled "The GM 'W–Body' Four–Disc System: How to Get Normal Life From Front Pads While Ensuring that Parking Brakes Work Correctly." *Bendix: Tech Talk*, Issue 92-1, Mar. 1992, one page.
Article by Bob Miller entitled "Hot Brakes on a Saab 900." (unnamed publication), vol. 2, No. 16, Dec. 1991, one page.
Article entitled "Tech Tip" regarding General Motors GM10 cards, updated, one page, first published on Sep. 2, 1992.
Technical paper by Aeromatics, Inc. entitled "Manufacturing Specifications," Sep. 2, 1992, one page.
Technical paper by Aeromatics, Inc. entitled "Premature Front Pad Wear" regarding GM W–Bodies, undated, three pages, first published on Sep. 2, 1992.
Technical paper by Aeromatics, Inc. entitled "Caliper Slider Pin Bushing Kit MP1–57," undated, three pages, first published during Nov., 1992.

*Primary Examiner*—Matthew C. Graham
*Attorney, Agent, or Firm*—Denton L. Anderson; Sheldon & Mak, Inc.

[57] ABSTRACT

A slider assembly useful for attaching a brake caliper having at least one caliper aperture to an automotive-chassis is provided. The slider assembly provides a bearing interface which allows for a smooth and reliable transverse movement of the brake caliper for an extended period of time. The slider assembly includes a sleeve insert which is fitted into the caliper aperture, a slide pin which slides inside the sleeve insert, and a mount for moving the slide pin to the automotive chassis. The sliding which occurs between the sleeve insert and the slide pin provides the bearing interface.

10 Claims, 2 Drawing Sheets

SLIDER ASSEMBLY FOR AUTOMOTIVE BRAKE CALIPER

FIELD OF THE INVENTION

The present invention is directed to a slider assembly used for slidably attaching an automotive brake caliper to an automotive chassis, in close proximity to a wheel rotor.

BACKGROUND

Brake calipers are commonly used on many automotives as part of the braking assemblies for the vehicle. Typically, the brake calipers are used to hold and compress a pair of opposing brake pads against the wheel rotor to slow and/or stop the wheel rotor. This slows and/or stops the wheel of the vehicle. In order to ensure equal wear on the opposed brake pads and to ensure safe braking, the same amount of pressure must be applied to each brake pad when compressing the brake pads against the wheel rotor.

A typical brake caliper operates similarly to a "C" clamp. The brake caliper compresses the opposed brake pads by extending a hydraulic cylinder positioned on one side of the wheel rotor to push one of the brake pads against the wheel rotor, while simultaneously causing the brake caliper to move transverse to the wheel rotor and pull the opposed brake pad against the wheel rotor. The brake caliper must be attached to the chassis of the automotive in such a fashion so that the brake caliper can move transverse to the wheel rotor to apply equal force to the opposed brake pads.

If the brake caliper does not move or has restricted movement, only one of the brake pads will make contact with the wheel rotor and/or one of the brake pads will be pressed against the wheel rotor with more force. If only one brake pad makes contact, only one pad will provide braking. The braking potential of the automotive will not be fully utilized, and the brake pads will wear unevenly. Accordingly, vehicles having brake calipers utilize some form of slider assembly to attach the caliper to the chassis of the automotive to facilitate the transverse movement of the brake caliper so that both brake pads contact the wheel rotor with the same amount of force.

On certain model automobiles, the brake caliper has at least one aperture and is attached to the chassis with a slide pin. This slide pin allows for the transverse movement of the caliper. However, in many instances, the slide pin is inadequate since it is prone to sticking, binding, and/or locking up during operation of the vehicle, thereby inhibiting and/or preventing the transverse movement of the brake caliper. Uneven and/or premature brake pad wear can result from an ineffective or defective slider assembly, thereby leading to reduced braking potential, premature, uneven brake pad wear, and/or brake failure.

Accordingly, there is a need for a slider assembly for a brake caliper having at least one caliper aperture, which provides easy and reliable transverse movement of the brake caliper for an extended period of time.

SUMMARY

This invention satisfies the need. The present invention is directed to a slider assembly which is useful for slidably attaching an automotive brake caliper having at least one caliper aperture to an automotive chassis in close proximity to a wheel rotor.

The slider assembly, having features of the present invention, provides a bearing interface for the brake caliper to slide upon. The slider assembly comprises a sleeve insert, a slide pin, and a mount.

The sleeve insert consists of a hollow tube having an interior surface and an exterior surface. The exterior surface has a cross-sectional area which corresponds to that of the caliper aperture and sized and is dimensioned to be interference fitted into the caliper aperture. The sleeve insert is made of a bearing material with the interior surface having a bearing surface finish.

The slide pin is made of a hard, wear-resistant material and is slidably disposed within the interior surface of the sleeve insert. The slide pin has an outer surface which is sized and dimensioned to closely conform and correspond to the interior surface of the sleeve insert. The outer surface of the slide pin has a bearing surface finish. The slide pin is slidably positioned in the sleeve insert with the interior surface of the sleeve insert and the outer surface of the slide pin forming a sliding bearing interface having opposed ends.

The mount fixably attaches the slide pin to the automotive chassis. The transverse movement of the slider assembly occurs in the sliding bearing interface between the sleeve insert and the slide pin and not between the mount and the slide pin.

In one embodiment of the invention, the sleeve insert can be made of bronze. The bronze provides the bearing material for the sliding bearing interface between the interior surface of the sleeve insert and the hard, wear-resistant slide pin.

The slider assembly can include an end guard positioned at each end of the bearing interface, prohibiting intrusion of contaminants into the bearing interface. Each end guard can be made of a resilient rubber, and each end guard can be attached to the brake caliper and the slide pin. Basically, the end guards cover the opposed ends of the bearing interface to protect the bearing interface from contaminants such as salt, water, and dirt, which may inhibit the movement of the slider assembly.

The slide pin can have a central aperture with a circular cross-section, and the mount can be a bolt which is shaped and dimensioned to snugly fit into the aperture in the slide pin. In this embodiment, the bolt is disposed in the aperture in the slide pin and is attached to the automotive chassis.

The present invention can be sold as a slider assembly to be installed in a brake caliper, can be sold as part of a new or reworked brake caliper to be installed in an automotive, or can be sold as part of a new vehicle.

The present invention provides an easy and reliable bearing interface for the automotive brake caliper to move transverse to the wheel rotor, thereby allowing each opposed brake pad to be applied with equivalent force to the wheel rotor. Accordingly, since equivalent force is applied to both brake pads, the braking potential of the car will be maximized and both brake pads will wear equivalently.

DRAWINGS

These and other features, aspects, and advantages of the present invention will become understood with reference to the following description, appended claims, and accompanying drawings where:

DESCRIPTION

Figure 1:
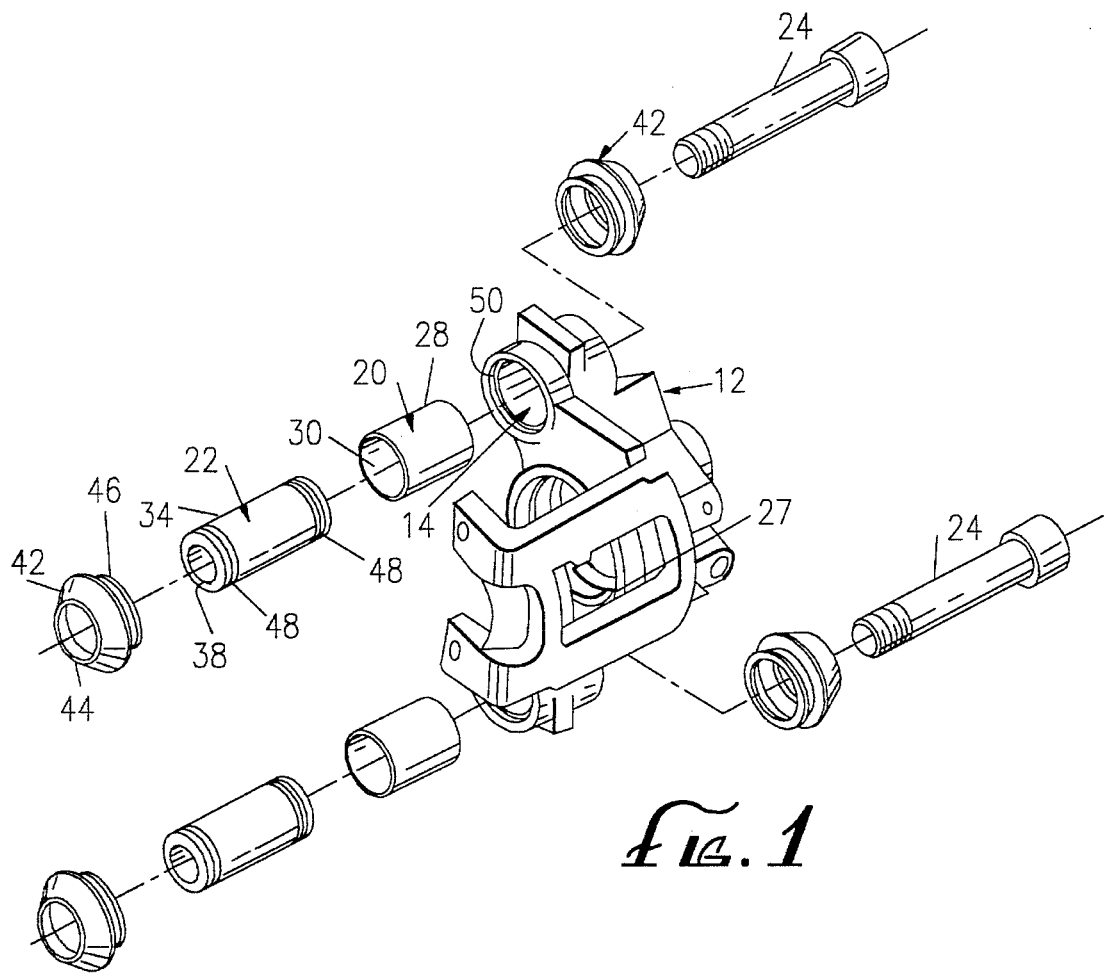
FIG. 1 is a perspective assembly drawing of a slider assembly embodying features of the present invention and a brake caliper.

The following discussion describes in detail one embodiment of the invention and several variations of that embodiment. This discussion should not be construed as limiting the invention to that particular embodiment or to those particular variations. Practitioners skilled in the art will recognize numerous other embodiments and variations as well. For definition of the complete scope of the invention, the reader is directed to the appended claims.

With reference to the figures, the present invention is directed to a slider assembly 10 useful for slidably attaching an automotive brake caliper 12 having at least one caliper aperture 14 to an automotive chassis 16 in close proximity to a wheel rotor 18. The slider assembly 10 comprises: a sleeve insert 20, a slide pin 22, and a mount 24.

The slider assembly 10 of this invention is directed to brake calipers 12 having at least one caliper aperture 14. The slider assembly 10 described in this invention can be installed in existing brake systems or be designed to fit new automotives. Presently, brake calipers 12, having at least one caliper aperture 14, are used in General Motors W-body automobiles, in particular, the Chevrolet Lumina, Buick Regal, Grand Prix, and Oldsmobile Cutlass Supreme. However, use of the slider assembly 10 is not limited to these models of vehicles and can be used on other vehicles which utilize at least one caliper aperture 14 to attach the brake caliper 12 to the chassis 16.

Figure 2:
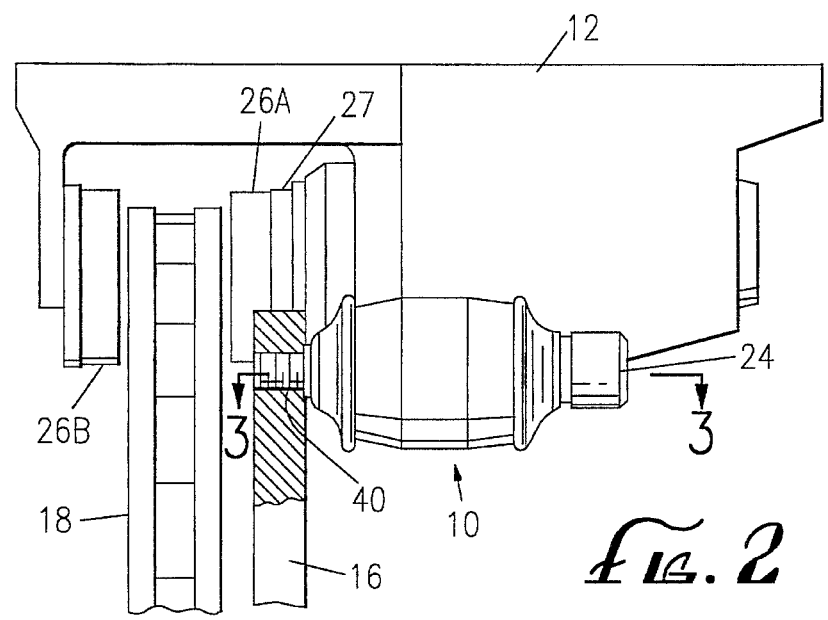
FIG. 2 is a front view in partial cutaway of an automotive wheel rotor and chassis having the brake caliper and slider assembly of FIG. 1 installed therein.

Brake calipers 12 are commonly used in the automotive industry and are well known in the art. Brake calipers 12 provide a clamping force which compresses opposed brake pads 26a, 26b against the wheel rotor 18. As shown in FIG. 2, the brake caliper 12 is attached to the automotive chassis 16 and is used to hold and compress opposed brake pads 26a, 26b against the wheel rotor 18 to slow and/or stop the wheel rotor 18. The brake caliper 12 utilizes a hydraulic cylinder 27 to push one of the brake pads 26a against the wheel rotor 18 while simultaneously causing the brake caliper 12 to move and pull the opposed brake pad 26b against the wheel rotor 18. The brake caliper 12 must have at least one caliper aperture 14 to use the slider assembly 10 which is described in this invention. Preferably, the brake caliper 12 has at least two caliper apertures 14 to reduce or prevent the rotational forces of the wheel rotor 18 from causing the slider assembly 10 to move or bind, thereby inhibiting smooth and easy transverse sliding of the brake caliper 12.

The sleeve insert 20 consists of a hollow tube having an exterior surface 28 and an interior surface 30. The exterior surface 28 of the sleeve insert 20 is sized and dimensioned to be interference fitted into the caliper aperture 14 so that during operation, no sliding occurs between the sleeve insert 20 and the caliper aperture 14. The shape and dimensions of the exterior surface 28 will depend upon the shape and dimensions of the caliper aperture 14. For example, if the shape of the cross-section of the caliper aperture 14 is rectangular, the cross-sectional shape of the exterior surface 28 will be rectangular. In the embodiment shown in the drawings, the exterior surface 28 has a circular cross-section with a diameter of about 0.927 inches ±0.001 inches and is designed to be inserted into a caliper aperture 14 having a circular cross-section with a diameter of about 0.926 inches ±0.001 inches. Alternatively, the sizes, dimensions, and the amount of interference will vary according to the size and shape of the caliper aperture 14 and the type of material used to make the sleeve insert 20. Excessive interference may cause breaking of the sleeve insert 20 when installing the sleeve insert 20 into the caliper aperture 14, while insufficient interference may cause sliding between the caliper aperture 14 and the sleeve insert 20.

The sleeve insert 20 is made of a bearing material. The bearing material is any material having a wettability or affirmity for lubricants and having minute projecting irregularities for the slide pin 22 to slide upon. White metals, babbitt, and bronzes are frequently used as a bearing material, but certain plastics, resins, ceramics, and other materials can also be employed. In particular, a self-lubricating, oil-like phosphor bronze is a satisfactory bearing material. Alternatively, certain other metals and alloys are particularly suited to be a bearing material, chiefly because of the fact that a proportion of hard crystals occurs in the background, or matrix, of softer metal, thus supporting the slide pin 22 and permitting the free circulation of the lubricant. In bronze, the crystals consist of a chemical compound of copper and tin. Other satisfactory bearing materials can be found in the *Materials Handbook*, George S. Brady and Henry R. Clauser, 12 Edition (1986), pages 83–87; the *Encyclopedia of Materials Science and Engineering*, Michael B. Brewer, Editor-in-Chief, the MIT Press, Volume 1, pages 284–288; and *McGraw-Hill Encyclopedia of Engineering*, Sybil P. Parker, Editor-in-Chief, pages 15–16, which are incorporated herein by reference.

The interior surface 30 of the sleeve insert 20 can be any size or shape. For example, the interior surface 30 can have a rectangular cross-sectional shape. Preferably, however, the interior surface 30 has a circular cross-section because this shape facilitates a good bearing interface 32 between the interior surface 30 of the sleeve insert 20 and a first outer surface 34 of the first slide pin 22 and manufacturing of the sleeve insert 20. In the embodiment shown in the drawing, the interior surface 30 has a circular cross-section with a diameter of about 0.874 inches. The diameter can be as large as 0.875, but it cannot be less than 0.874 inches.

Figure 3:
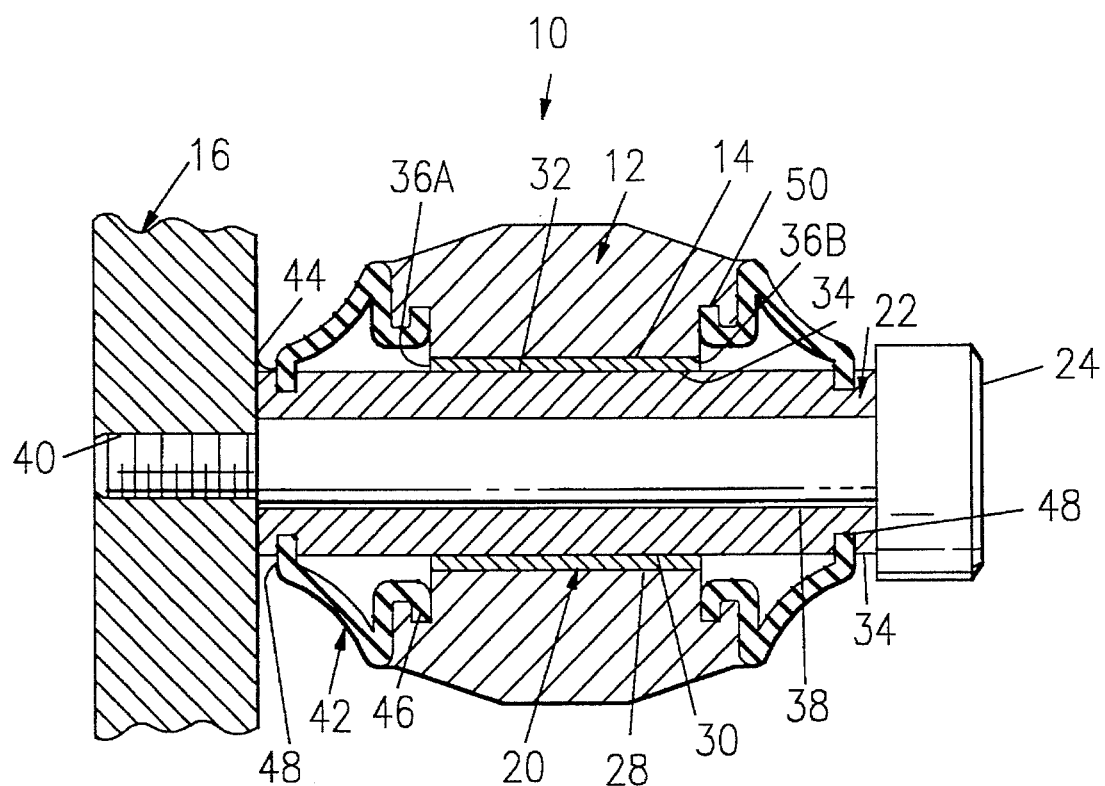
FIG. 3 is a top view of the slider assembly and automotive chassis taken on line 3—3 of FIG. 2.

The slide pin 22 is slidably disposed within the interior surface 30 of the sleeve insert 20 and has the outer surface 34 which is sized and dimensioned to closely conform to the interior surface 30 of the sleeve insert 20. The interior surface 30 of the sleeve insert 20 and the outer surface 34 of the slide pin 22 form the sliding bearing interface 32 having opposed ends 36a, 36b. As shown in FIG. 3, the sliding bearing interface 32 is formed along most of the outer surface 34 of the first slide pin 22.

The outer surface 34 of the slide pin 22 must conform to the interior surface 30 of the sleeve insert 20 so that the load carried by the slider assembly 10 is carried over a relatively large area. In the embodiment shown in the drawing, the interior surface 30 has a circular cross-section. In the embodiment shown in the drawings, the first outer surface 34 and a second outer surface 35 of a second slide pin 23 are the only slidable contact surfaces between the brake caliper 12 and the first and second slide pins 22 and 23, respectively. Accordingly, the outer surface 34 of the slide pin 22 must have a circular cross-section to correspond to that of the interior surface 30. In the embodiment shown in the drawings, the diameter of the outer surface 34 is about 0.872 inches. The diameter can be as small as 0.871, but it cannot be larger than 0.872 inches. However, this can vary according to the design of the slider assembly 10. The radial clearance between the outer surface 34 and the interior surface 30 is preferably less than one-thousandth of the outer surface 34 diameter to ensure good geometrical conformity in the bearing interface 32 between these surfaces.

The interior surface 30 of the sleeve insert 20 and the outer surface 34 of the slide pin 22 each have a bearing surface finish. A bearing surface finish is a surface finish of less than 300 microinch rms. Preferably, the surface finish is less than 150 microinch rms. A bearing surface finish on the interior surface 30 and the outer surface 34 is required to form a good bearing interface 32 in which the weight of the brake caliper 12 is distributed and carried over a relatively large area. Accordingly, operation of the slider assembly 10 improves as the surface finish of the interior surface 30 and the outer surface 34 improves.

The slide pin 22 is made from a hard, wear-resistant material to inhibit wear in the slide pin 22. Typically, high-carbon steels, grades AISI 1060 to 1095 are excellent for this task. Alternatively, other types of hard, wear-resistant steels or materials can be utilized. For example, heat-treated, or case-hardened, medium-carbon steel may be used.

Depending upon the bearing material and hard, wear-resistant material utilized, a lubricant may be required between the bearing interface 32. The type of lubricant will depend upon the bearing material and the hard, wear-resistant material utilized.

The mount 24 can be any device capable of fixably attaching the slide pin 22 to the automotive chassis 16. As shown in FIGS. 2 and 3, the slide pin 22 can have an aperture 38, and the mount 24 can be a bolt which extends through the slide pin aperture 38 and is threaded into corresponding female threads 40 in the chassis 16. Alternatively, the mount 24 could be a male-threaded rod attached, i.e., by weld or machined as part of the slide pin 22, to one end of the slide pin 22. The threaded rod could be threaded into corresponding female threads 40 in the chassis 16. A person skilled in the art could develop many alternate ways to attach the slide pin 22 to the chassis 16. For example, the slide pin 22 could have an aperture 38 with female threads, and the mount 24 could be a corresponding bolt which slides through an opening in the chassis 16 and threads into the slide pin 22.

An end guard 42 can be used to inhibit the intrusion of contaminants, i.e., dirt, dust, water, into the opposed ends 36a, 36b of the bearing interface 32. As shown in the drawing, the end guard 42 can be a cover having an outer seal 44 which attaches to the slide pin 22 and an inner seal 46 which attaches to the brake caliper 12. The inner seal 46 of the end guard 42 attaches to an annular groove 48 in the outer surface 34 of the slide pin 22. The outer seal 44 of the end guard 42 attaches to an annular groove 50 disposed in the caliper aperture 14 of the brake caliper 12. In this embodiment, the end guard 42 must be flexible to allow movement in the bearing interface 32 since the outer seal 44 of the end guard 42 attaches to the slide pin 22, while the inner seal 46 attaches to the brake caliper 12. A resilient rubber is an effective end guard 42 material since it provides flexibility and resistance to weather while providing a tight seal around the slide pin 22 and the brake caliper 12.

Alternatively, other types of end guards 42 could be developed by those skilled in the art. For example, seals could be disposed in the bearing interface 32 in close proximity to the opposed ends 36a, 36b of the sliding bearing interface 32.

The present invention is a slider assembly 10 capable of slidably attaching a brake caliper 12 having at least one caliper aperture 14 to an automotive chassis 16. The slider assembly 10 has a bearing interface 32 which provides easy and reliable transverse movement of a brake caliper 12 for extended periods of time and in extreme environments. This reliable transverse movement provides equivalent pressure on brake pads 26, thereby ensuring even brake pad 26 wear and quicker braking.

Although the present invention has been described in considerable detail with reference to certain preferred versions, many other versions should be apparent to those skilled in the art. Therefore, the spirit and scope of the appended should not necessarily be limited to the description of the preferred versions contained therein.

What is claimed is:

1. A slider assembly for slidably attaching an automotive brake caliper to an automotive chassis in close proximity to a wheel rotor, the automotive brake caliper having first and second caliper apertures, the slider assembly comprising:

(a) a first sleeve insert consisting of a hollow tube having a first interior surface and a first exterior surface, the first sleeve insert being sized and dimensioned to be interference fitted into the first caliper aperture and being made of a bearing material with the first interior surface having a circular cross-section and a bearing finish;

(b) a second sleeve insert consisting of a hollow tube having a second interior surface and a second exterior surface, the second sleeve insert being sized and dimensioned to be interference fitted into the second caliper aperture and being made of a bearing material with the second interior surface having a circular cross-section and a bearing finish;

(c) a first hard, wear-resistant slide pin slidably disposed within the first interior surface of the first sleeve insert, the first slide pin having a first outer surface which is sized and dimensioned to closely conform to the first interior surface, the first outer surface of the first slide pin having a bearing finish, whereby the first interior surface and the first outer surface form a first sliding bearing interface having opposed ends;

(d) a second hard, wear-resistant slide pin slidably disposed within the second interior surface of the second sleeve insert, the second slide pin having a second outer surface which is sized and dimensioned to closely conform to the second interior surface, the second outer surface of the second slide pin having a bearing finish, whereby the second interior surface and the second outer surface form a second sliding bearing interface having opposed ends;

(e) a first mount having means for fixably attaching the first slide pin to the automotive chassis; and (f) a second mount having means for fixably attaching the second slide pin to an automotive chassis;

wherein the first and second sliding bearing interfaces support and guide the brake caliper on the first and second slide pins.

2. The slider assembly of claim 1, wherein the bearing material is bronze.

3. The slider assembly of claim 1 further comprising an end guard at each end of the first and second bearing interfaces for inhibiting the intrusion of contaminants into the first and second bearing interfaces.

4. The slider assembly of claim 3, wherein each end guard is made of a resilient rubber.

5. The slider assembly of claim 1 wherein the first and second slide pins each have a central aperture having a circular cross-section and the first and second mounts comprise bolts shaped and dimensioned to snugly fit into the apertures in the first and second slide pins, respectively.

6. A slider assembly for slidably attaching an automotive brake caliper to an automotive chassis in close proximity to a wheel rotor, the automotive brake caliper having first and second caliper apertures, the automotive chassis being fixedly attached to first and second mounts, the slider assembly comprising:

(a) a first sleeve insert consisting of a hollow tube having a first interior surface and a first exterior surface, the first sleeve insert being sized and dimensioned to be interference fitted into the first caliper aperture so that no sliding occurs between the brake caliper and the first sleeve insert, the first sleeve insert being made of a bearing material with the first interior surface having a bearing finish;

(b) a first hard, wear-resistant slide pin slidably disposed within the first interior surface, the first slide pin having a first outer surface which is sized and dimensioned to closely conform to the first interior surface, the first outer surface having a bearing finish, the first interior surface and the first outer surface forming a first sliding bearing interface along most of the first outer surface, the first bearing interface having opposed ends, the first slide pin having means for fixedly attaching the slide pin to the mount;

(c) a second sleeve insert consisting of a hollow tube having a second interior surface and a second exterior surface, the second sleeve insert being sized and dimensioned to be interference fitted into the second caliper aperture so that no sliding occurs between the brake caliper and the second sleeve insert, the second sleeve insert being made of a bearing material with the second interior surface having a bearing finish; and (d) a second hard, wear-resistant slide pin slidably disposed within the second interior surface, the second slide pin having a second outer surface which is sized and dimensioned to closely conform to the second interior surface, the second outer surface having a bearing finish, the second interior surface and the second outer surface forming a second sliding bearing interface along most of the second outer surface, the second bearing interface having opposed ends, the second slide pin having means for fixedly attaching the second slide pin to the second mount;

wherein the first and second sliding bearing interfaces support and guide the brake caliper on the first and second slide pins.

7. The slider assembly of claim 6 further comprising an end guard at each opposing end of the first and second bearing interfaces for inhibiting the intrusion of contaminants into the first and second bearing interfaces.

8. An automobile comprising:

(a) an automotive chassis;

(b) an automotive brake caliper having first and second caliper apertures;

(c) a slider assembly for slidably attaching the automobile brake caliper to the automotive chassis in close proximity to a wheel rotor, the slider assembly comprising:

(i) a first sleeve insert consisting of a hollow tube having a first interior surface and a first exterior surface, the first sleeve insert being sized and dimensioned to be interference fitted into the first caliper aperture so that no sliding occurs between the brake caliper and the first sleeve insert, the first sleeve insert being made of a bearing material with the interior surface having a bearing finish;

(ii) a first hard, wear-resistant slide pin slidably disposed within the first interior surface, the first slide pin having a first outer surface which is sized and dimensioned to closely conform to the first interior surface, the first outer surface having a bearing finish, the first interior surface and the first outer surface forming a first sliding bearing interface along most of the first outer surface, the first bearing interface having opposed ends;

(iii) a first mount having means for fixably attaching the first slide pin to the automotive chassis;

(iv) a second sleeve insert consisting of a hollow tube having a second interior surface and a second exterior surface, the second sleeve insert being sized and dimensioned to be interference fitted into the second caliper aperture so that no sliding occurs between the brake caliper and the second sleeve insert, the second sleeve insert being made of a bearing material with the second interior surface having a bearing finish;

(v) a second, hard, wear-resistant slide pin slidably disposed within the second interior surface, the second slide pin having a second outer surface which is sized and dimensioned to closely conform to the second interior surface, the second outer surface having a bearing finish, the second interior surface and the second outer surface forming a second sliding bearing interface along most of the second outer surface, the second bearing interface having opposed ends; and (vi) a second mount having means for fixably attaching the second slide pin to the automotive chassis;

wherein the first and second sliding bearing interfaces support and guide the automotive brake caliper on the first and second slide pins.

9. A brake caliper assembly for a motor vehicle having an automotive chassis and a wheel rotor, the automotive chassis being fixedly attached to first and second mounts, the caliper assembly comprising:

(a) an automotive brake caliper having first and second caliper apertures;

(b) a slider assembly for slidably attaching the automobile brake caliper to the automotive chassis in close proximity to the wheel rotor, the slider assembly comprising:

(i) a first sleeve insert consisting of a hollow tube having a first interior surface and a first exterior surface, the first sleeve insert being sized and dimensioned to be interference fitted into the first caliper aperture and being made of a bearing material with the first interior surface having a bearing finish;

(ii) a first hard, wear-resistant slide pin slidably disposed within the first interior surface, the first slide pin having a first outer surface which is sized and dimensioned to closely conform to the first interior surface, the first outer surface having a bearing finish, whereby the first interior surface and the first outer surface form a first sliding bearing interface along most of the first outer surface, the first bearing interface having opposed ends, the first slide pin having means for fixedly attaching the first slide pin to the first mount;

(iii) a second sleeve insert consisting of a hollow tube having a second interior surface and a second exterior surface, the second sleeve insert being sized and dimensioned to be interference fitted into the second caliper aperture and being made of a bearing material with the first interior surface having a bearing finish; and (iv) a first hard, wear-resistant slide pin slidably disposed within the second interior surface, the second slide pin having a second outer surface which is sized and dimensioned to closely conform to the second interior surface, the second outer surface having a bearing finish, whereby the second interior surface and the second outer surface form a second sliding bearing interface along most of the second outer surface, the second bearing interface having opposed ends, the second slide pin having means for fixedly attaching the second slide pin to the second mount;

wherein the first and second sliding bearing interfaces support and guide the automotive brake caliper on the first and slide pins.

10. The caliper assembly of claim 9 further comprising an end guard at each end of the first and second bearing interfaces for inhibiting the intrusion of contaminants into the bearing interfaces.

* * * * *